(12) United States Patent
Feng et al.

(10) Patent No.: US 10,038,246 B2
(45) Date of Patent: Jul. 31, 2018

(54) BASE STATION

(71) Applicant: Huawei Technologies Co., Ltd., Shenzhen (CN)

(72) Inventors: Liexun Feng, Shanghai (CN); Tao Zhou, Xi'an (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/276,063

(22) Filed: Sep. 26, 2016

(65) Prior Publication Data

US 2017/0012358 A1  Jan. 12, 2017

Related U.S. Application Data

(63) Continuation of application No. PCT/CN2015/071547, filed on Jan. 26, 2015.

(30) Foreign Application Priority Data

Mar. 26, 2014 (CN) .......................... 2014 1 0116678
Mar. 26, 2014 (CN) ..................... 2014 2 0140791 U

(51) Int. Cl.
*H01Q 1/50* (2006.01)
*H01Q 9/28* (2006.01)
*H01Q 21/00* (2006.01)
*H01Q 9/06* (2006.01)
*H01Q 21/24* (2006.01)
*H01Q 1/24* (2006.01)
*H04B 1/38* (2015.01)

(Continued)

(52) U.S. Cl.
CPC ............. *H01Q 9/065* (2013.01); *H01Q 1/246* (2013.01); *H01Q 1/525* (2013.01); *H01Q 21/24* (2013.01); *H04B 1/38* (2013.01); *H04B 7/10* (2013.01); *H04W 88/08* (2013.01)

(58) Field of Classification Search
CPC ........ H01Q 1/246; H01Q 21/24; H01Q 1/525; H01Q 9/065; H01Q 21/00; H01Q 9/28; H01Q 1/50; H01Q 1/38
USPC .......................... 343/700 MS, 793, 795, 853
See application file for complete search history.

(56) References Cited

U.S. PATENT DOCUMENTS 4,001,837 A * 1/1977 Regenos .................. H01Q 3/22
                                                                    342/375
5,264,862 A * 11/1993 Kumpfbeck ............. H01Q 9/18
                                                                    343/799

(Continued)

FOREIGN PATENT DOCUMENTS

CN    101018370 A    8/2007
CN    101023559 A    8/2007

(Continued)

*Primary Examiner* — Tho G Phan
(74) *Attorney, Agent, or Firm* — Slater Matsil, LLP

(57) ABSTRACT

Embodiments provide a base station, including an antenna unit and a radio frequency unit. A port corresponding to a receive channel that is of the radio frequency unit and in a working state and a port corresponding to a transmit channel that is of the radio frequency unit and in the working state are separately connected to ports corresponding to different dual-polarized dipoles or different single-polarized dipoles in the antenna unit. The different dual-polarized dipoles or the different single-polarized dipoles in the antenna unit are mutually isolated.

11 Claims, 5 Drawing Sheets

(51) Int. Cl.
 *H01Q 1/52* (2006.01)
 *H04B 7/10* (2017.01)
 H04W 88/08 (2009.01)

(56) References Cited

U.S. PATENT DOCUMENTS

| | | |
|---|---|---|
| 6,640,111 B1 | 10/2003 | Shapira |
| 2008/0026796 A1 | 1/2008 | Thomas |
| 2008/0204318 A1* | 8/2008 | Thomas ................ H01Q 1/246 342/361 |
| 2009/0058725 A1* | 3/2009 | Barker ................ H04B 7/0408 342/372 |
| 2009/0066595 A1 | 3/2009 | Barker et al. |
| 2011/0110438 A1 | 5/2011 | Johansson |

FOREIGN PATENT DOCUMENTS

| | | |
|---|---|---|
| CN | 101291165 A | 10/2008 |
| CN | 101291166 A | 10/2008 |
| CN | 101507143 A | 8/2009 |
| CN | 201594821 U | 9/2010 |
| CN | 201663236 U | 12/2010 |
| CN | 102917460 A | 2/2013 |
| EP | 1756969 B1 | 3/2008 |
| EP | 2577875 B1 | 4/2013 |
| RU | 2342784 C2 | 12/2008 |
| WO | 2011148341 A1 | 12/2011 |

* cited by examiner

BASE STATION

CROSS-REFERENCE TO RELATED APPLICATIONS

This application claims the benefit of International filing No. PCT/CN2015/071547 filed on Jan. 26, 2015, which claims priority to Chinese Patent Application No. 201410116678.6 filed on Mar. 26, 2014 and Chinese Patent Application No. 201420140791.3 filed on Mar. 26, 2014, which are incorporated herein by reference.

TECHNICAL FIELD

The present invention relates to communications technologies, and in particular, to a base station.

BACKGROUND

With shortage of construction funds of operators, network sharing has become a universally used network construction manner. The network sharing is generally divided into a multioperator radio access network (MORAN for short) and a multioperator core network (MOCN for short). On the MOCN, multiple operators share a spectrum and a wireless access device. On the MORAN, multiple operators respectively have their own independent spectrums, and only share a wireless access device. For example, three operators respectively have their own independent spectrums, but share one radio frequency module and an antenna. In this way, for each operator, originally, a set of base station equipment needs to be set up for each operator; however, at present, the three operators use only one set of base station equipment. Therefore, ⅔ network construction costs may be saved, and additionally their own spectrum competitiveness can be ensured. The radio frequency module may be a remote radio unit (RRU for short), or a macro base station radio frequency unit (RFU for short).

A DD800M frequency band totally has a bandwidth of 30 M, which is successively divided into 3 carriers, C1, C2, and C3, according to the frequency band if 10 M is one carrier, where C1 is adjacent to C2 and C2 is adjacent to C3. The 3 operators each occupy a bandwidth of 10 M. To save network construction costs, the 3 operators use a three-party MORAN solution, which requires one radio frequency module to support 3 carriers, with one carrier for each operator. However, due to particularity of the DD800M frequency band, during implementation of the requirement, a problem that an intermodulation signal generated on a downlink interferes with an uplink signal occurs. Some of intermodulation signals generated in the 3 carriers and between the carriers on the downlink of the DD800M frequency band fall within an uplink frequency band interval, and severely interfere with an uplink signal of a base station, causing reduction of receiver sensitivity of the radio frequency module. Because transmit power of a downlink signal is very high, and the uplink signal is weak, if an intermodulation signal generated by the uplink signal falls within a downlink frequency band interval, interference to the downlink is small, and may be ignored. Besides the DD800M, another frequency band used in mobile communication also has a problem that an intermodulation signal generated on a downlink interferes with an uplink signal.

A solution of dual radio frequency modules can solve the foregoing problem of the intermodulation interference. Between two adjacent carriers C1+C2 or between two adjacent carriers C2+C3 of the DD800M frequency band, the intermodulation interference generated on the downlink does not fall within an uplink interval. In this way, 2 RRUs/RFUs and 2 dual-polarized antennas may be configured for each sector, two adjacent carriers C1+C2 or two adjacent carriers C2+C3 are configured on one radio frequency module, two adjacent carriers C2+C3 or two adjacent carriers C1+C2 are configured on the other radio frequency module, and the two radio frequency modules can support 3 carriers and implement a 3-party MORAN function after being combined. However, each sector needs to use 2 radio frequency modules, which increases a quantity of radio frequency modules, thereby increasing costs of devices and projects, and an objective of the MORAN is to share the radio frequency modules. Therefore, significance of the MORAN solution is reduced.

SUMMARY

Embodiments provide a base station, which is configured to solve a problem of interference of an intermodulation signal generated by a downlink signal to an uplink signal.

Embodiments provide a base station, including an antenna unit and a radio frequency unit. A port corresponding to a receive channel that is of the radio frequency unit and in a working state and a port corresponding to a transmit channel that is of the radio frequency unit and in the working state are separately connected to ports corresponding to different dual-polarized dipoles or different single-polarized dipoles in the antenna unit. The different dual-polarized dipoles or the different single-polarized dipoles in the antenna unit are mutually isolated.

In a first possible implementation manner, the antenna unit includes N dual-polarized dipoles, where the N dual-polarized dipoles include N/2 first dual-polarized dipoles and N/2 second dual-polarized dipoles, each dual-polarized dipole corresponds to 2 ports in the antenna unit, and N is an even number. That a port corresponding to a receive channel that is of the radio frequency unit and in a working state and a port corresponding to a transmit channel that is of the radio frequency unit and in the working state are separately connected to ports corresponding to different dual-polarized dipoles in the antenna unit is specifically that: any 2 transceiver ports in the radio frequency unit are separately connected to ports corresponding to one dual-polarized dipole in the antenna unit; receive channels corresponding to 2 transceiver ports in the radio frequency unit that are connected to 2 ports corresponding to the first dual-polarized dipole in the antenna unit are in a closed state, and transmit channels corresponding to the 2 transceiver ports in the radio frequency unit that are connected to the 2 ports corresponding to the first dual-polarized dipole in the antenna unit are in the working state; and transmit channels corresponding to 2 transceiver ports in the radio frequency unit that are connected to 2 ports corresponding to the second dual-polarized dipole in the antenna unit are in the closed state, and receive channels corresponding to the 2 transceiver ports in the radio frequency unit that are connected to the 2 ports corresponding to the second dual-polarized dipole in the antenna unit are in the working state.

With reference to the first aspect, in a second possible implementation manner, the radio frequency unit includes 2 receive ports and 2 transceiver ports, and the antenna unit includes 2 dual-polarized dipoles, where each dual-polarized dipole corresponds to 2 ports in the antenna unit; and that a port corresponding to a receive channel that is of the radio frequency unit and in a working state and a port corresponding to a transmit channel that is of the radio frequency unit and in the working state are separately connected to ports corresponding to different dual-polarized dipoles in the antenna unit is specifically that: the 2 transceiver ports in the radio frequency unit are separately connected to ports corresponding to one dual-polarized dipole of the antenna unit, receive channels of the 2 transceiver ports in the radio frequency unit are in a closed state, transmit channels of the 2 transceiver ports in the radio frequency unit are in the working state, and the 2 receive ports in the radio frequency unit are separately connected to ports corresponding to the other dual-polarized dipole of the antenna unit.

With reference to the first aspect, in a third possible implementation manner, the radio frequency unit includes 2 transceiver ports, and the antenna unit includes 2 single-polarized dipoles, where each single-polarized dipole corresponds to one port in the antenna unit; and that a port corresponding to a receive channel that is of the radio frequency unit and in a working state and a port corresponding to a transmit channel that is of the radio frequency unit and in the working state are separately connected to ports corresponding to different single-polarized dipoles in the antenna unit is specifically that: the 2 transceiver ports in the radio frequency unit are separately connected to 2 ports in the antenna unit, where a receive channel of either transceiver port in the radio frequency unit is in a closed state and a transmit channel is in the working state, and a transmit channel of the other transceiver port in the radio frequency unit is in the closed state and a receive channel is in the working state.

With reference to the first aspect, in a fourth possible implementation manner, the radio frequency unit includes 2 radio frequency subunits, where each radio frequency subunit includes 3 transceiver ports and 3 receive ports, and the antenna unit includes 6 dual-polarized dipoles, where each dual-polarized dipole corresponds to 2 ports in the antenna unit, where the 6 dual-polarized dipoles include 3 first dual-polarized dipoles and 3 second dual-polarized dipoles; and that a port corresponding to a receive channel that is of the radio frequency unit and in a working state and a port corresponding to a transmit channel that is of the radio frequency unit and in the working state are separately connected to ports corresponding to different dual-polarized dipoles in the antenna unit is specifically that: 12 ports in the antenna unit are separately connected to 12 ports in the radio frequency unit, where 1 port in each of the first dual-polarized dipoles in the antenna unit is connected to a transceiver port of 1 radio frequency subunit, and the other port is connected to a transceiver port of the other radio frequency subunit; and 1 port in each of the second dual-polarized dipoles in the antenna unit is connected to a receive port of 1 radio frequency subunit, and the other port is connected to a receive port of the other radio frequency subunit; and receive channels of all the transceiver ports in each of the radio frequency subunits are in a closed state, and transmit channels are in the working state.

With reference to the first aspect, in a fifth possible implementation manner, the base station further includes a combiner, where the radio frequency unit includes a first radio frequency subunit and a second radio frequency subunit; and the antenna unit includes 2 dual-polarized dipoles, where 1 dual-polarized dipole corresponds to 2 ports in the antenna unit; the first radio frequency subunit, which includes 2 transceiver ports, and the second radio frequency unit, which includes 4 transceiver ports, share one dual-polarized antenna that has 2 ports; and that a port corresponding to a receive channel that is of the radio frequency unit and in a working state and a port corresponding to a transmit channel that is of the radio frequency unit and in the working state are separately connected to ports corresponding to different dual-polarized dipoles in the antenna unit is specifically that: 2 transceiver ports in the second radio frequency subunit are separately connected to 2 ports corresponding to one dual-polarized dipole in the antenna unit, and the other 2 transceiver ports in the second radio frequency subunit are separately connected to 2 ports in the combiner; the 2 transceiver ports in the first radio frequency subunit are separately connected to another 2 ports of the combiner; and other 2 ports of the combiner are connected to 2 ports corresponding to the other dual-polarized dipole in the antenna unit; and receive channels of the 2 transceiver ports in the second radio frequency subunit that are connected to the combiner are in a closed state, and transmit channels are in the working state.

In the foregoing technical solutions, receiving and transmitting by a radio frequency unit are separately performed on different polarized dipoles, but not performed on a same polarized dipole. The radio frequency unit receives a signal and transmits a signal separately on different dual-polarized dipoles or different single-polarized dipoles, and different dual-polarized dipoles or different single-polarized dipoles in an antenna unit are mutually isolated, that is, an uplink channel is isolated from a downlink channel, and an uplink and a downlink are completely not affected. Therefore, interference of an intermodulation signal of a transmitted signal of the radio frequency unit to a received signal, that is, interference of an intermodulation signal of a downlink carrier to an uplink signal, is prevented. The base station provided in the embodiments of the present invention can eliminate interference of an intermodulation signal generated by downlink signals on a same frequency band to an uplink signal, and can also eliminate interference of an intermodulation signal generated by downlink signals on different frequency bands to an uplink signal.

DETAILED DESCRIPTION OF ILLUSTRATIVE EMBODIMENTS

Embodiments of the present invention apply to standards such as Long Term Evolution (LTE for short), Universal Mobile Telecommunications System (UMTS for short), and Global System for Mobile Communications (GSM for short), and supported frequency bands include but are not limited to DD800M, 700M, 1800M, 1900M, and 900M frequency bands. The embodiments eliminate interference of intermodulation signals generated by downlinks on a same frequency band and different frequency bands to an uplink. The intermodulation interference includes but is not limited to third-order intermodulation interference and fifth-order intermodulation interference. It should be noted that, not all downlink signals interfere with an uplink signal, and interference is generated only when an intermodulation interference condition is met. The intermodulation interference condition is that: if f1 and f2 are any two frequencies in a downlink frequency band, intermodulation signals whose frequencies are 2f1+f2 and 2f1−f2 are generated between the two frequencies; and if falling within an uplink frequency band, the intermodulation signals generate intermodulation interference to an uplink. The uplink signal is a signal transmitted by a terminal such as a mobile phone and received by an antenna, and the signal transmitted by the terminal is very weak, and therefore the interference greatly affects the uplink signal. In addition, interference of the uplink to a downlink may be ignored, because the uplink signal (at a milliwatt level) is excessively weak relative to the downlink signal (dozens of watts).

Figure 1:
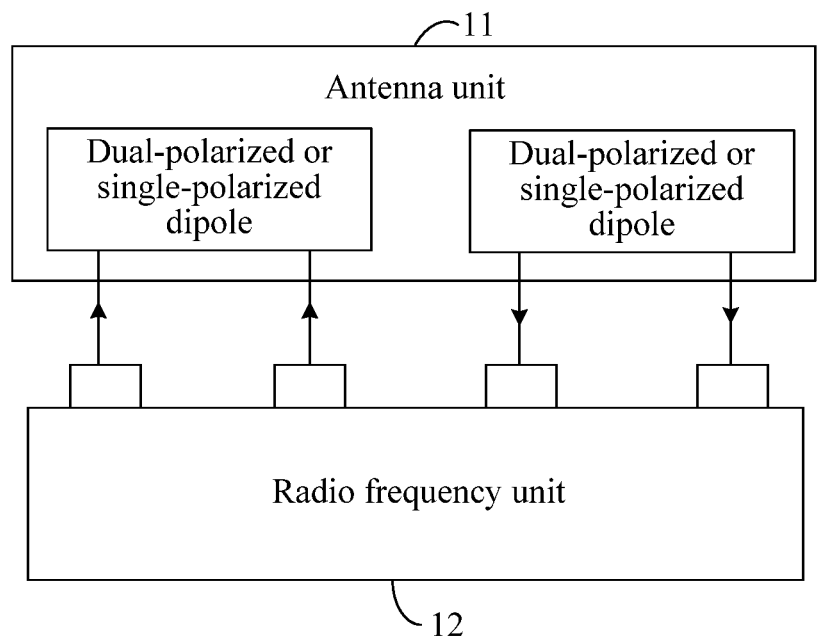
FIG. 1 is a schematic structural diagram of a base station according to an embodiment.

FIG. 1 is a schematic structural diagram of a base station according to an embodiment. The base station shown in FIG. 1 includes an antenna unit 11 and a radio frequency unit 12, where the radio frequency unit 12 may be an RFU, or may be an RRU. The radio frequency unit may support three carriers or two non-adjacent carriers of DD800M. The antenna unit 11 shown in FIG. 1 includes two dual-polarized dipoles or two single-polarized dipoles. A dual-polarized dipole refers to that two antenna elements are installed together, where one polarization direction is +45 degrees, and the other polarization direction is −45 degrees. A single-polarized dipole refers to one antenna element and one polarization direction.

A port corresponding to a receive channel that is of the radio frequency unit 12 and in a working state and a port corresponding to a transmit channel that is of the radio frequency unit 12 and in the working state are separately connected to ports corresponding to different dual-polarized dipoles or different single-polarized dipoles in the antenna unit 11. That is, receiving and transmitting by the radio frequency unit are separately performed on the different dual-polarized dipoles but not performed on a same dual-polarized dipole; or, receiving and transmitting by the radio frequency unit are separately performed on the different single-polarized dipoles but not performed on a same single-polarized dipole.

The radio frequency unit receives a signal and transmits a signal separately on different dual-polarized dipoles or different single-polarized dipoles, and different dual-polarized dipoles or different single-polarized dipoles in the antenna unit are mutually isolated, that is, an uplink channel is isolated from a downlink channel, and an uplink and a downlink are completely not affected. Therefore, interference of an intermodulation signal of a transmitted signal of the radio frequency unit to a received signal, that is, interference of an intermodulation signal of a downlink carrier to an uplink signal, is prevented. The method provided in this embodiment of the present invention can eliminate interference of an intermodulation signal generated by downlink signals on a same frequency band to an uplink signal, and can also eliminate interference of an intermodulation signal generated by downlink signals on different frequency bands to an uplink signal.

The technical solution provided in this embodiment uses an existing radio frequency unit, for example, an RRU and an RFU, and a simple and feasible networking solution; a technical problem of interference between an uplink and a downlink is solved without a need to add a radio frequency unit, and a requirement that multiple users share the radio frequency unit is met. Compared with an existing solution with multiple RRUs/RFUs, which uses 2 radio frequency units, this embodiment, which uses only one radio frequency unit, saves ½ network construction costs, and system performance is completely not affected.

For example, in a case in which the antenna unit includes N dual-polarized dipoles, where 1 dual-polarized dipole corresponds to 2 ports in the antenna unit, and the radio frequency unit includes 2N transceiver ports, to prevent interference of a third-order intermodulation signal of a downlink carrier to an uplink signal, a manner of connecting the antenna unit and the radio frequency unit is as follows: N is an even number, and the N dual-polarized dipoles include N/2 first dual-polarized dipoles and N/2 second dual-polarized dipoles.

That a port corresponding to a receive channel that is of the radio frequency unit and in a working state and a port corresponding to a transmit channel that is of the radio frequency unit and in the working state are separately connected to ports corresponding to different dual-polarized dipoles in the antenna unit is specifically that: any 2 transceiver ports in the radio frequency unit are separately connected to ports corresponding to one dual-polarized dipole in the antenna unit.

Receive channels corresponding to 2 transceiver ports in the radio frequency unit that are connected to 2 ports corresponding to the first dual-polarized dipole in the antenna unit are in a closed state, and transmit channels corresponding to the 2 transceiver ports in the radio frequency unit that are connected to the 2 ports corresponding to the first dual-polarized dipole in the antenna unit are in the working state. Transmit channels corresponding to 2 transceiver ports in the radio frequency unit that are connected to 2 ports corresponding to the second dual-polarized dipole in the antenna unit are in the closed state, and receive channels corresponding to the 2 transceiver ports in the radio frequency unit that are connected to the 2 ports corresponding to the second dual-polarized dipole in the antenna unit are in the working state. That is, the N dual-polarized dipoles of the antenna unit are divided into two groups, where a receiving function of transceiver ports of the radio frequency unit that are connected to one group of dual-polarized dipoles is disabled, and a transmitting function of transceiver ports of the radio frequency unit that are connected to the other group of dual-polarized dipoles is disabled. Therefore, the radio frequency unit receives a signal and transmits a signal on different dual-polarized dipoles, thereby preventing interference of an intermodulation signal generated by a downlink signal to an uplink signal. The interference of the intermodulation signal generated by the downlink signal to the uplink signal can be eliminated for both a same frequency band and different frequency bands.

In FIG. 2A to FIG. 6, TX (Transmit) indicates a transmit port, RX (Receive) indicates a receive port, and RX/TX (Receive/Transmit) indicates a transceiver port. Embodiments corresponding to FIG. 2A to FIG. 6 are separately specific embodiments of FIG. 1.

Figure 2A:
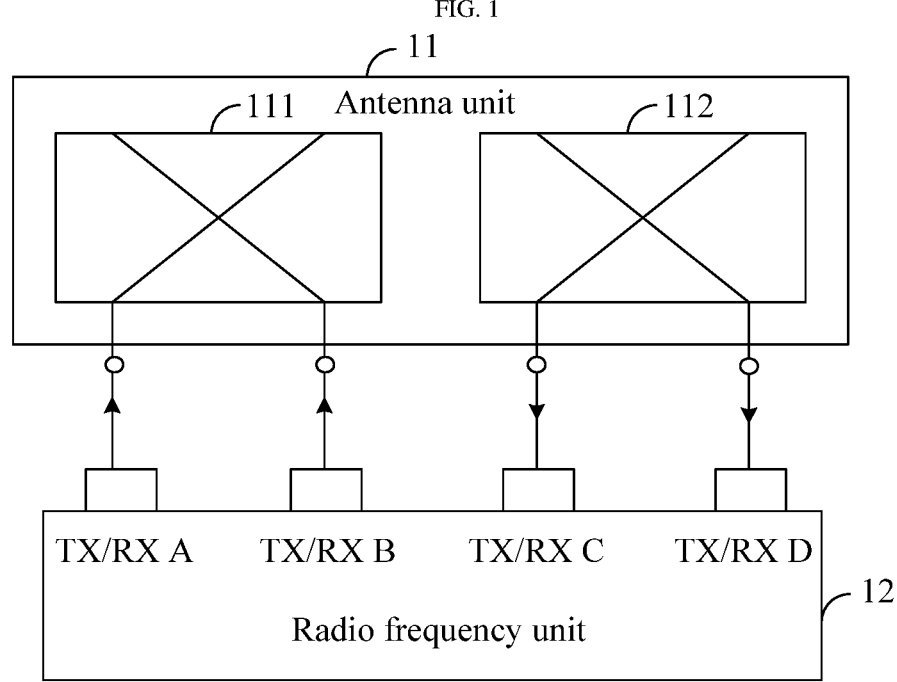
FIG. 2A is a schematic structural diagram of another base station according to an embodiment.
Figure 2B:
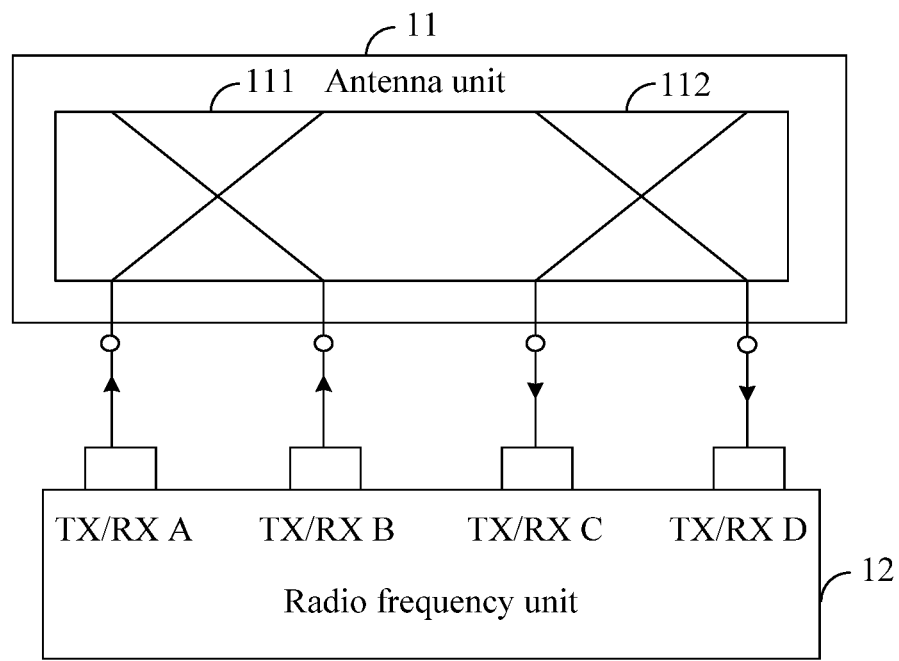
FIG. 2B is a schematic structural diagram of an alternative base station that is equivalent to the base station in FIG. 2A.

FIG. 2A is a schematic structural diagram of another base station according to an embodiment. As shown in FIG. 2A, an antenna unit 11 provided in this embodiment includes 2 dual-polarized dipoles, where 1 dual-polarized dipole is a first dual-polarized dipole, the other dual-polarized dipole is a second dual-polarized dipole, and each dual-polarized dipole corresponds to 2 ports in the antenna unit; a radio frequency unit 12 provided in this embodiment includes 4 transceiver ports: A, B, C, and D. As shown in FIG. 2A, the antenna unit 11 is 2 dual-polarized antennas that each have 2 ports, and the two dual-polarized antennas are installed together. As shown in FIG. 2B, the antenna unit 11 may also be 1 dual-polarized antenna that has 4 ports. The radio frequency unit 12 may be an RFU, or may be an RRU. The radio frequency unit may support three carriers of DD800M or two non-adjacent carriers of DD800M.

The 4 transceiver ports of the radio frequency unit 12 are separately connected to the 4 ports in the antenna unit. Receive channels of the corresponding 2 transceiver ports A and B in the radio frequency unit 12 that are connected to one dual-polarized dipole in of the antenna unit 11 are in a closed state, and transmit channels of the 2 transceiver ports C and D in the radio frequency unit that are connected to the other dual-polarized dipole 112 of the antenna unit are in the closed state. That is, the receive channels of the transceiver ports A and B in the radio frequency unit 12 are in the closed state, and the transceiver ports A and B in the radio frequency unit 12 have only a transmitting function during working; the transmit channels of the transceiver ports C and D in the radio frequency unit 12 are in the closed state, and the transceiver ports C and D in the radio frequency unit 12 have only a receiving function during working. The radio frequency unit 12 transmits a signal by using the dual-polarized dipole 111 of the antenna unit 11, and the radio frequency unit 12 receives a signal by using the dual-polarized dipole 112 of the antenna unit 11. The radio frequency unit 12 receives a signal and transmits a signal separately on different dual-polarized dipoles. Therefore, intermodulation signals generated by transmitted signals of the transceiver ports A and B of the radio frequency unit 12 are prevented from interfering with received signals of the transceiver ports C and D of the radio frequency unit 12. Similarly, intermodulation signals generated by transmitted signals of the transceiver ports C and D of the radio frequency unit 12 are also prevented from interfering with received signals of the transceiver ports A and B of the radio frequency unit 12.

Figure 3:
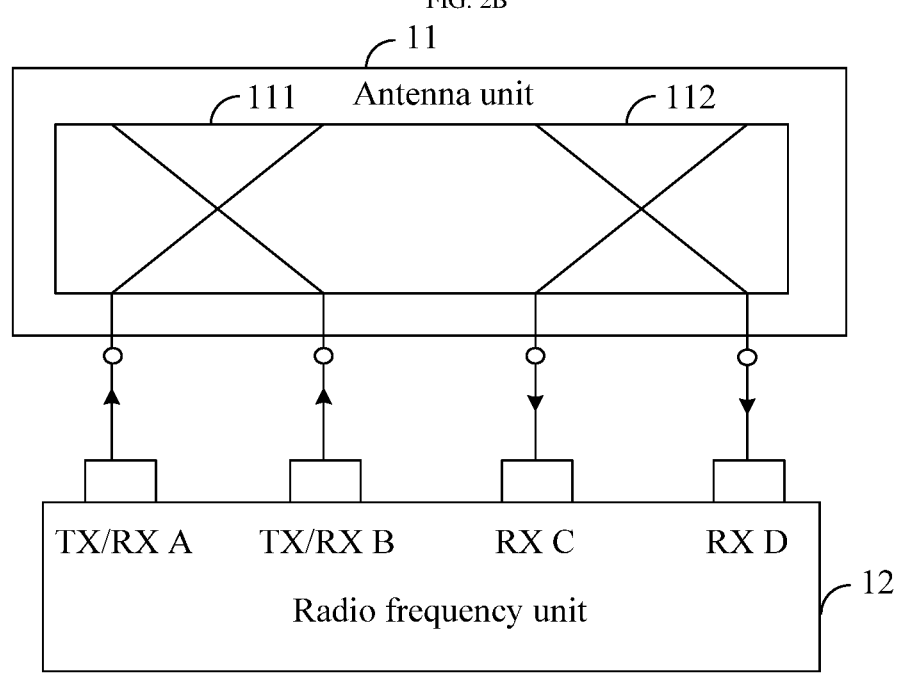
FIG. 3 is a schematic structural diagram of still another base station according to an embodiment.

FIG. 3 is a schematic structural diagram of still another base station according to an embodiment. A difference between FIG. 3 and FIG. 2A lies in that, a radio frequency unit 11 in FIG. 3 includes 2 receive ports and 2 transceiver ports, where A and B are the transceiver ports and C and D are the receive ports, while the radio frequency unit 11 in FIG. 2A includes 4 transceiver ports. An antenna unit in FIG. 3 is 1 dual-polarized antenna that has 4 ports, or may be 2 dual-polarized antennas that each have 2 ports. A radio frequency unit 12 may be an RFU, or may be an RRU. The radio frequency unit may support three carriers of DD800M or two non-adjacent carriers of DD800M.

Similarly, the antenna unit 11 includes 2 dual-polarized dipoles, where 1 dual-polarized dipole corresponds to 2 ports in the antenna unit.

A port corresponding to a receive channel that is of the radio frequency unit and in a working state and a port corresponding to a transmit channel that is of the radio frequency unit and in the working state are separately connected to ports corresponding to different dual-polarized dipoles in the antenna unit, and a specific implementation manner is as follows: the 2 transceiver ports in the radio frequency unit are separately connected to ports corresponding to one dual-polarized dipole in of the antenna unit, receive channels of the 2 transceiver ports A and B in the radio frequency unit are in a closed state, transmit channels of the 2 transceiver ports A and B in the radio frequency unit are in the working state, and the 2 receive ports C and D in the radio frequency unit are separately connected to ports corresponding to the other dual-polarized dipole 112 of the antenna unit. Therefore, the radio frequency unit transmits signals from the transceiver ports A and B, and receives signals from the receive ports C and D, and a third-order intermodulation signal between downlink carriers does not interfere with an uplink signal.

Similarly, the radio frequency unit 12 may also include 2 transceiver ports A and B, and 2 transmit ports C and D. The 2 transceiver ports in the radio frequency unit are separately connected to ports corresponding to one dual-polarized dipole in of the antenna unit, transmit channels of the 2 transceiver ports A and B in the radio frequency unit are in a closed state, and the 2 transmit ports C and D in the radio frequency unit are separately connected to ports corresponding to the other dual-polarized dipole 112 of the antenna unit. Therefore, the ports C and D in the radio frequency unit transmit a signal by using the dual-polarized dipole 112, and the ports A and B receive a signal by using the dual-polarized dipole 111, ensuring that antenna isolation for transmitting and receiving is maximum, and that an intermodulation signal generated by a downlink does not interfere with an uplink signal.

Figure 4:
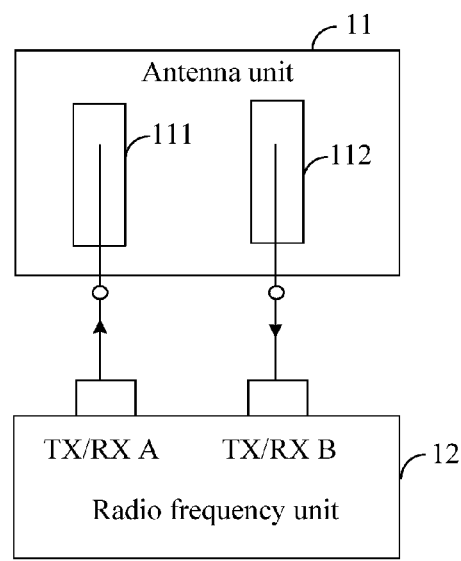
FIG. 4 is a schematic structural diagram of yet another base station according to an embodiment.

FIG. 4 is a schematic structural diagram of still another base station according to an embodiment. In this embodiment, an antenna unit uses a single-polarized dipole. As shown in FIG. 4, a antenna unit 11 includes 2 single-polarized dipoles, where 1 single-polarized dipole corresponds to one port in the antenna unit, and a radio frequency unit 12 includes 2 transceiver ports. The antenna unit 11 may be 2 antennas that each have 1 single-polarized dipole, or may be 1 single-polarized antenna that has 2 ports. This embodiment applies to indoor coverage networking. The radio frequency unit 12 supports three carriers of DD800M or two non-adjacent carriers of DD800M.

A port corresponding to a receive channel that is of the radio frequency unit and in a working state and a port corresponding to a transmit channel that is of the radio frequency unit and in the working state are separately connected to ports corresponding to different single-polarized dipoles in the antenna unit, and a specific implementation manner is as follows: the 2 transceiver ports in the radio frequency unit are separately connected to 2 ports in the antenna unit, where a receive channel of 1 transceiver port in the radio frequency unit is in a closed state and a transmit channel is in the working state, and a transmit channel of the other transceiver port in the radio frequency unit is in the closed state and a receive channel is in the working state. Specifically, in FIG. 4, a receive channel of a port A of the radio frequency unit 12 is in the closed state during working, and a transmit channel of a port B is in the closed state during working. That is, a signal is transmitted from the port A, a signal is received from the port B, and the port A and the port B are connected to different single-polarized dipoles. Therefore, receiving and transmitting by the radio frequency unit 12 are separately performed on different single-polarized dipoles in the antenna unit, and a transmitted signal of the port A does not interfere with a received signal of the port B, preventing an intermodulation signal between downlink carriers from interfering with an uplink signal. Similarly, a receive channel of the port B may be closed, and a transmit channel of the port A may be closed. That is, a signal is transmitted from the port A, a signal is received from the port B, and the port A and the port B are connected to different single-polarized dipoles. Therefore, receiving and transmitting by the radio frequency unit 12 are separately performed on different single-polarized dipoles in the antenna unit, and a transmitted signal of the port A does not interfere with a received signal of the port B, preventing an intermodulation signal between downlink carriers from interfering with an uplink signal.

Figure 5:
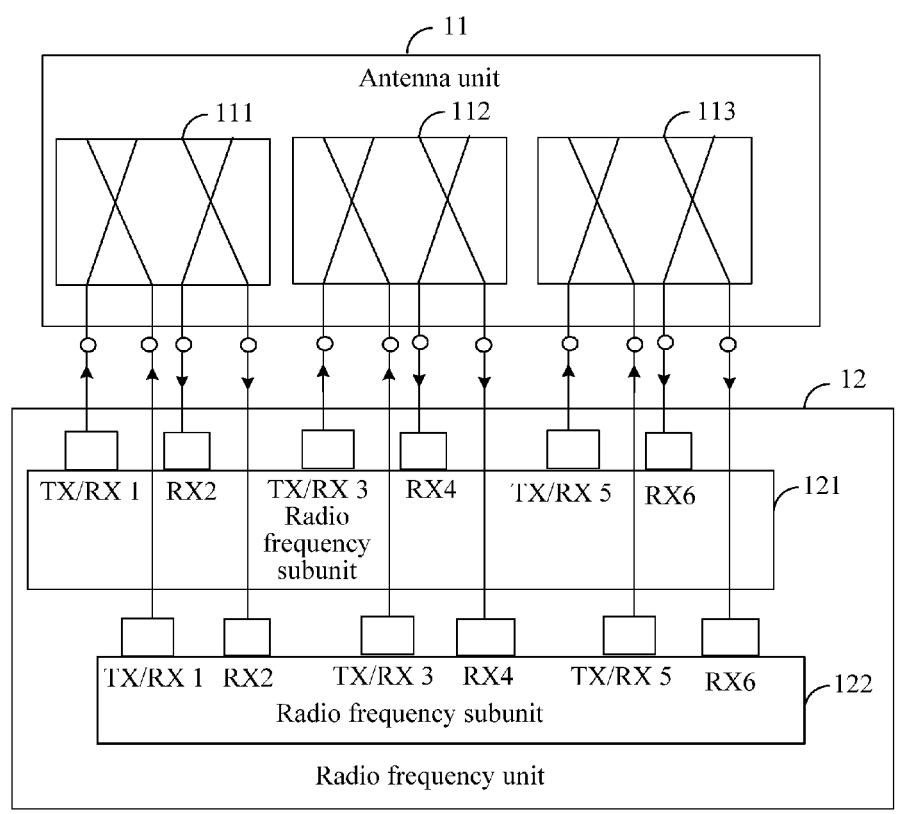
FIG. 5 is a schematic structural diagram of yet another base station according to an embodiment.

FIG. 5 is a schematic structural diagram of still another base station according to an embodiment. In this embodiment, a radio frequency unit is set so that 3 ports are for transmitting, and 6 ports are for receiving; during networking, on each site, there are three sectors, and 2 RRUs/RFUs are configured. The radio frequency unit provided in this embodiment includes 2 radio frequency subunits, where each radio frequency subunit includes 3 transceiver ports and 3 receive ports, and each radio frequency unit may support three carriers or two non-adjacent carriers of DD800M. An antenna unit includes 6 dual-polarized dipoles, where each dual-polarized dipole corresponds to 2 ports in the antenna unit.

As shown in FIG. 5, the radio frequency unit 12 includes 2 radio frequency subunits 121 and 122, where in the radio frequency subunit 121, ports 1, 3, and 5 are transceiver ports, and ports 2, 4, and 6 are receive ports; and in the radio frequency subunit 122, ports 1, 3, and 5 are transceiver ports, and ports 2, 4, and 6 are receive ports. The antenna unit is 3 dual-polarized antennas 111, 112, and 113 that each have 4 ports.

A port corresponding to a receive channel that is of the radio frequency unit and in a working state and a port corresponding to a transmit channel that is of the radio frequency unit and in the working state are separately connected to ports corresponding to different dual-polarized dipoles in the antenna unit, and a specific implementation manner is as follows: 12 ports in the antenna unit are separately connected to 12 ports in the radio frequency unit, where 1 port in each first dual-polarized dipole in the antenna unit is connected to a transceiver port of 1 radio frequency subunit, and the other port in the first dual-polarized dipole is connected to a transceiver port of the other radio frequency subunit; and 1 port in each second dual-polarized dipole in the antenna unit is connected to a receive port of 1 radio frequency subunit, and the other port in the second dual-polarized dipole is connected to a receive port of the other radio frequency subunit. To prevent downlink transmitting from interfering with uplink receiving, a receiving function of all the transceiver ports of each of the radio frequency subunits is disabled, that is, receive channels of all the transceiver ports in each of the radio frequency subunits are in a closed state, and transmit channels are in the working state. That is, the two radio frequency subunits form one sector that has 2 ports for transmitting and 2 ports for receiving, by separately using one transmit port and one receive port, and one dual-polarized antenna that has 4 ports or 2 dual-polarized antennas that each have 2 ports, and the two radio frequency subunits form 3 sectors in which an uplink and a downlink are isolated and 2 ports are for transmitting and 2 ports are for receiving.

As shown in FIG. 5, 1 port in one dual-polarized dipole of the dual-polarized antenna 111 is connected to a transceiver port 1 in the radio frequency subunit 121, and the other port in the dual-polarized dipole is connected to a transceiver port 1 in the radio frequency subunit 122; 1 port in the other dual-polarized dipole of the dual-polarized antenna 111 is connected to a receive port 2 in the radio frequency subunit 121, and the other port in the dual-polarized dipole is connected to a receive port 2 in the radio frequency subunit 122. In this way, the transceiver port 1 in the radio frequency subunit 121 and the transceiver port 1 in the radio frequency subunit 122 transmit a signal by using one dual-polarized dipole of the dual-polarized antenna 111, and receive a signal by using the other dual-polarized dipole of the dual-polarized antenna 111. Signal receiving and signal transmitting are performed on different dual-polarized dipoles, preventing an intermodulation signal between downlink carriers from interfering with an uplink signal.

A manner in which the dual-polarized antenna 112 and the dual-polarized antenna 113 are connected to a radio frequency subunit is similar to a manner in which the dual-polarized antenna 111 is connected to a radio frequency subunit. To prevent an intermodulation signal generated by the downlink transmitting from interfering with the uplink receiving, receive channels of all the transceiver ports in each radio frequency subunit are in a closed state, and have only a transmitting function during working.

Figure 6:
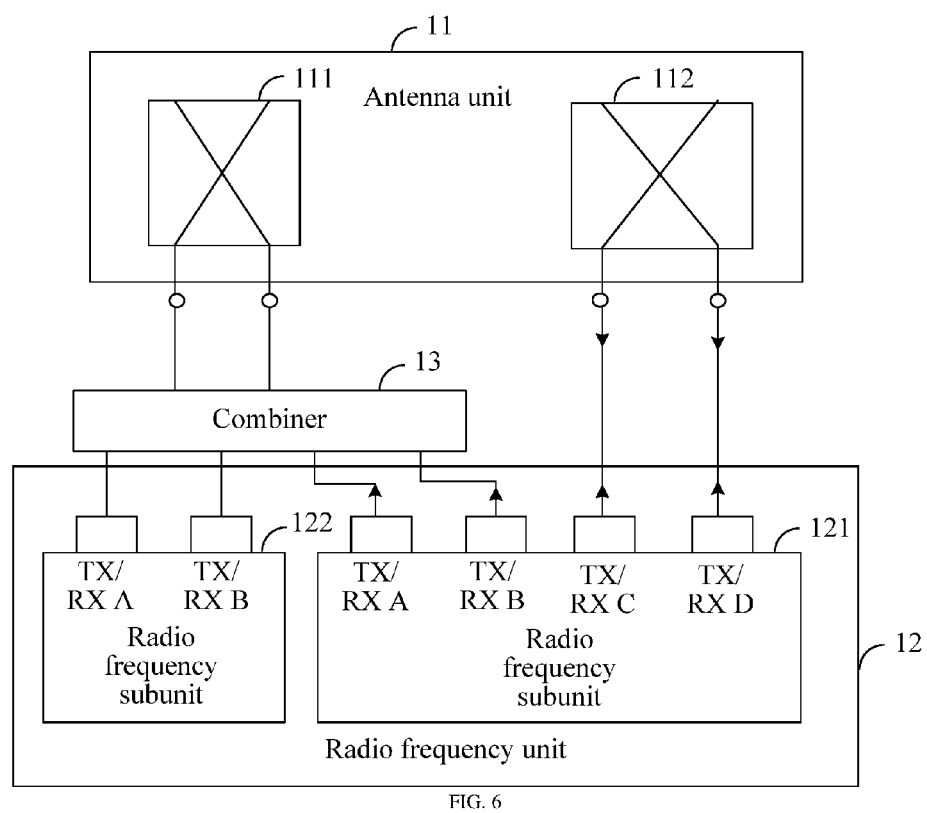
FIG. 6 is a schematic structural diagram of yet another base station according to an embodiment.

FIG. 6 is a schematic structural diagram of still another base station according to an embodiment. In this embodiment, two radio frequency subunits share one dual-polarized antenna by using a combiner. As shown in FIG. 6, the base station provided in this embodiment includes an antenna unit 11, a radio frequency unit 12, and a combiner 13. The radio frequency unit includes a radio frequency subunit 121 and a radio frequency subunit 122, and the antenna unit 11 includes 2 dual-polarized dipoles, where each dual-polarized dipole corresponds to 2 ports in the antenna unit.

The radio frequency subunit 121 includes 2 transceiver ports, the radio frequency subunit 122 includes 4 transceiver ports, and the radio frequency subunit 121 and the radio frequency subunit 122 share one dual-polarized antenna that has 2 ports. That is, the 2T2R radio frequency subunit 121 uses a frequency band F1, the 4T4R radio frequency subunit 122 uses a frequency band F2, and the frequency band F2 and the frequency band F1 share one dual-polarized antenna by using the combiner, to form a system with 4 ports for transmitting and 4 ports for receiving.

2 transceiver ports of the radio frequency subunit 122 are separately connected to 2 ports corresponding to one dual-polarized dipole 111 in the antenna unit, and the other 2 transceiver ports of the radio frequency subunit 122 are separately connected to 2 ports of the combiner 13. The 2 transceiver ports of the radio frequency subunit 121 are separately connected to another 2 ports of the combiner 13; other 2 ports of the combiner are connected to 2 ports corresponding to the other dual-polarized dipole 112 in the antenna unit.

A frequency of a third-order intermodulation signal of a downlink carrier on the frequency band F1 falls within an uplink area of the frequency band F2, which affects receiving performance of F2. To prevent interference, a port corresponding to a receive channel that is of the radio frequency unit and in a working state and a port corresponding to a transmit channel that is of the radio frequency unit and in the working state are separately connected to ports corresponding to different dual-polarized dipoles in the antenna unit, and a specific implementation manner is as follows: a receiving function of 2 transceiver ports A and B of the radio frequency subunit 122 that uses the frequency band F2 may be disabled, that is, receive channels of the 2 transceiver ports in the radio frequency subunit 122 that are connected to the combiner are in a closed state, and transmit channels are in the working state, so as to prevent the third-order intermodulation signal of the downlink carrier on the frequency band F1 from affecting performance of the frequency band F2. In this way, in the radio frequency subunit 122, the transceiver ports A and B transmit a signal by using the dual-polarized antenna 111, and transceiver ports C and D receive and transmit a signal by using the dual-polarized antenna 112, which may prevent an intermodulation signal generated by a downlink signal transmitted by the radio frequency subunit 121 from affecting a received signal of the radio frequency subunit 122. In this embodiment, only an intermodulation signal generated by a downlink of F1 interferes with an uplink signal of F1.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A base station, comprising:
   an antenna unit; and
   a radio frequency unit;
   wherein a port corresponding to a receive channel of the radio frequency unit in a working state and a port corresponding to a transmit channel of the radio frequency unit in the working state are separately connected to ports corresponding to different dual-polarized dipoles or different single-polarized dipoles in the antenna unit, and wherein each of the different dual-polarized dipoles or the different single-polarized dipoles in the antenna unit are mutually isolated from all other dual-polarized dipoles or single-polarized dipoles in the antenna unit.

2. The base station according to claim 1, wherein the antenna unit comprises N dual-polarized dipoles, wherein the N dual-polarized dipoles comprise N/2 first dual-polarized dipoles and N/2 second dual-polarized dipoles, each dual-polarized dipole corresponds to two ports in the antenna unit, and N is an even number;
   wherein the radio frequency unit comprises 2N transceiver ports; and
   wherein the port corresponding to the receive channel of the radio frequency unit in the working state and the port corresponding to the transmit channel of the radio frequency unit in the working state being separately connected to ports corresponding to different dual-polarized dipoles in the antenna unit comprises:
      two transceiver ports in the radio frequency unit being separately connected to two ports corresponding to a first dual-polarized dipole in the antenna unit;
      receive channels corresponding to the two transceiver ports in the radio frequency unit that are separately connected to the two ports corresponding to the first dual-polarized dipole in the antenna unit being in a closed state, and transmit channels corresponding to the two transceiver ports in the radio frequency unit that are separately connected to the two ports corresponding to the first dual-polarized dipole in the antenna unit being in the working state; and
      transmit channels corresponding to two transceiver ports in the radio frequency unit that are connected to two ports corresponding to a second dual-polarized dipole in the antenna unit being in the closed state, and receive channels corresponding to the two transceiver ports in the radio frequency unit that are connected to the two ports corresponding to the second dual-polarized dipole in the antenna unit being in the working state.

3. The base station according to claim 2, wherein the radio frequency unit comprises four transceiver ports, the antenna unit comprises the first dual-polarized dipole and the second dual-polarized dipole, and each of the first dual-polarized dipole and the second dual-polarized dipole separately correspond to two ports in the antenna unit;
   wherein the receive channels corresponding to the two transceiver ports in the radio frequency unit that are separately connected to the two ports corresponding to the first dual-polarized dipole in the antenna unit being in a closed state, and transmit channels corresponding to the two transceiver ports in the radio frequency unit that are separately connected to the two ports corresponding to the first dual-polarized dipole in the antenna unit being in the working state comprises:
      the four transceiver ports in the radio frequency unit being separately connected to four ports in the antenna unit, wherein receive channels of two transceiver ports in the radio frequency unit that are connected to the first dual-polarized dipole of the antenna unit being in the closed state, and transmit channels of the two transceiver ports in the radio frequency unit that are connected to the first dual-polarized dipole of the antenna unit being in the working state; and
   wherein transmit channels corresponding to the two transceiver ports in the radio frequency unit that are connected to the two ports corresponding to the second dual-polarized dipole in the antenna unit being in the closed state, and receive channels corresponding to the two transceiver ports in the radio frequency unit that are connected to the two ports corresponding to the second dual-polarized dipole in the antenna unit being in the working state comprises:
      transmit channels of the two transceiver ports in the radio frequency unit that are connected to the second dual-polarized dipole of the antenna unit being in the closed state, and receive channels of the two transceiver ports in the radio frequency unit that are connected to the second dual-polarized dipole of the antenna unit being in the working state.

4. The base station according to claim 1, wherein the radio frequency unit comprises two receive ports and two transceiver ports, and the antenna unit comprises two dual-polarized dipoles, wherein each dual-polarized dipole corresponds to two ports in the antenna unit; and
   wherein the port corresponding to the receive channel of the radio frequency unit in the working state and the port corresponding to the transmit channel of the radio frequency unit in the working state being separately connected to ports corresponding to different dual-polarized dipoles in the antenna unit comprises:
      the two transceiver ports in the radio frequency unit being separately connected to ports corresponding to a first dual-polarized dipole of the antenna unit, receive channels of the 2 transceiver ports in the radio frequency unit being in a closed state, transmit channels of the two transceiver ports in the radio frequency unit being in the working state, and the two receive ports in the radio frequency unit being separately connected to ports corresponding to a second dual-polarized dipole of the antenna unit.

5. The base station according to claim 1, wherein the antenna unit comprises a single dual-polarized antenna that comprises four ports, or the antenna unit comprises two dual-polarized antennas that each comprises two ports.

6. The base station according to claim 1, wherein the radio frequency unit comprises a first transceiver port and a second transceiver port, and the antenna unit comprises two single-polarized dipoles, wherein each single-polarized dipole corresponds to one port in the antenna unit; and wherein the port corresponding to the receive channel of the radio frequency unit in the working state and the port corresponding to the transmit channel of the radio frequency unit in the working state being separately connected to ports corresponding to different single-polarized dipoles in the antenna unit comprises:

the first transceiver port and the second transceiver port in the radio frequency unit being separately connected to two ports in the antenna unit, wherein a receive channel of the first transceiver port in the radio frequency unit is in a closed state and a transmit channel is in the working state, and a transmit channel of the second transceiver port in the radio frequency unit is in the closed state and a receive channel is in the working state.

7. The base station according to claim 1, wherein the radio frequency unit comprises two radio frequency subunits, wherein each radio frequency subunit comprises three transceiver ports and three receive ports, and the antenna unit comprises six dual-polarized dipoles, wherein each dual-polarized dipole corresponds to two ports in the antenna unit, wherein the six dual-polarized dipoles comprise three first dual-polarized dipoles and three second dual-polarized dipoles; and wherein the port corresponding to the receive channel of the radio frequency unit in the working state and the port corresponding to the transmit channel of the radio frequency unit in the working state being separately connected to ports corresponding to different dual-polarized dipoles in the antenna unit comprises:

twelve ports in the antenna unit being separately connected to twelve ports in the radio frequency unit, wherein a port in each of the first dual-polarized dipoles in the antenna unit is connected to a transceiver port of one of the two radio frequency subunit, and an other port is connected to a transceiver port of the other radio frequency subunit, and a port in each of the second dual-polarized dipoles in the antenna unit is connected to a receive port of one of the radio frequency subunits, and the other port is connected to a receive port of the other radio frequency subunit; and receive channels of all the transceiver ports in each of the two radio frequency subunits are in a closed state, and transmit channels are in the working state.

8. The base station according to claim 7, wherein the antenna unit comprises three dual-polarized antennas that each comprises four ports.

9. The base station according to claim 1, further comprising:

a combiner, wherein the radio frequency unit comprises a first radio frequency subunit and a second radio frequency subunit, and the antenna unit comprises two dual-polarized dipoles, and wherein a first dual-polarized dipole corresponds to two ports in the antenna unit;

wherein the first radio frequency subunit comprises two transceiver ports;

wherein the second radio frequency unit comprises four transceiver ports;

wherein the first radio frequency subunit and the second radio frequency subunit share a dual-polarized antenna that comprises two ports; and wherein the port corresponding to the receive channel of the radio frequency unit and in the working state and the port corresponding to the transmit channel of the radio frequency unit in the working state being separately connected to ports corresponding to different dual-polarized dipoles in the antenna unit comprises:

two transceiver ports in the second radio frequency subunit being separately connected to two ports corresponding to a first dual-polarized dipole in the antenna unit, and the other two transceiver ports in the second radio frequency subunit being separately connected to two ports in the combiner;

the two transceiver ports in the first radio frequency subunit being separately connected to another two ports of the combiner; and the other two ports of the combiner being connected to two ports corresponding to a second dual-polarized dipole in the antenna unit; and receive channels of the two transceiver ports in the second radio frequency subunit that are connected to the combiner being in a closed state, and transmit channels being in the working state.

10. The base station according to claim 9, wherein the antenna unit comprises two dual-polarized antennas that each has two ports.

11. A method, comprising:

providing an antenna unit;

providing a radio frequency unit; and separately connecting a port corresponding to a receive channel of the radio frequency unit in a working state and a port corresponding to a transmit channel of the radio frequency unit in the working state to first ports corresponding to different dual-polarized dipoles or different single-polarized dipoles in the antenna unit, wherein each of the first ports corresponds to only a single dual-polarized dipole or only a single single-polarized dipole, and wherein the different dual-polarized dipoles or the different single-polarized dipoles in the antenna unit are mutually isolated from all other dual-polarized dipoles or single-polarized dipoles in the antenna unit.

* * * * *